(12) United States Patent
Kaita et al.

(10) Patent No.: US 6,960,631 B2
(45) Date of Patent: Nov. 1, 2005

(54) CATALYST COMPOSITION AND PROCESS FOR PRODUCING COPOLYMER

(75) Inventors: Shojiro Kaita, Saitama (JP); Zhaomin Hou, Saitama (JP); Yasuo Wakatuki, Saitama (JP)

(73) Assignee: Riken, Saitama (JP)

( * ) Notice: Subject to any disclaimer, the term of this patent is extended or adjusted under 35 U.S.C. 154(b) by 111 days.

(21) Appl. No.: 10/240,925

(22) PCT Filed: Apr. 5, 2001

(86) PCT No.: PCT/JP01/02947

§ 371 (c)(1),
(2), (4) Date: Mar. 28, 2003

(87) PCT Pub. No.: WO01/77199

PCT Pub. Date: Oct. 18, 2001

(65) Prior Publication Data

US 2003/0166458 A1 Sep. 4, 2003

(30) Foreign Application Priority Data

Apr. 7, 2000 (JP) .................................. 2000-105917
Aug. 30, 2000 (JP) .................................. 2000-260030

(51) Int. Cl.$^7$ ............................................. C08F 297/06
(52) U.S. Cl. ..................... 525/314; 525/269; 526/340
(58) Field of Search .................. 525/269, 314; 526/164, 340; 502/117, 153, 155

(56) References Cited

U.S. PATENT DOCUMENTS

| 4,689,368 A | * | 8/1987 | Jenkins ................... 525/247 |
| 5,096,970 A | | 3/1992 | Hattori et al. |
| 5,958,820 A | * | 9/1999 | Taube et al. ............... 502/102 |
| 6,284,697 B1 | * | 9/2001 | Windisch et al. ........... 502/102 |
| 6,399,726 B1 | * | 6/2002 | Windisch et al. ........... 526/164 |
| 6,444,762 B1 | | 9/2002 | Fischer et al. |
| 6,683,140 B2 | * | 1/2004 | Kaita et al. ............... 526/160 |

FOREIGN PATENT DOCUMENTS

| EP | 1086957 A1 | 3/2001 |
| EP | 1 086 957 A1 | 3/2001 |
| JP | 05-125134 A | 5/1993 |

OTHER PUBLICATIONS

Hackh's Chem. Dictionary, 4th ed., McGraw–Hill, Inc., p. 171 (1969).*
Copy of Supplementary European Search Report dated Apr. 19, 2004, of European Application No. 01919786.

* cited by examiner

*Primary Examiner*—Fred Teskin
(74) *Attorney, Agent, or Firm*—Millen White Zelano & Branigan, P.C.

(57) ABSTRACT

A method for block copolymerization of a conjugated diene and an aromatic vinyl compound, which comprises the steps of carrying out homopolymerization of the conjugated diene in the presence of a catalyst composition comprising the following components: (A) a metallocene type complex of a rare earth metal compound, and (B) an ionic compound composed of a non-coordinate anion and a cation and/or an aluminoxane, and then adding the aromatic vinyl compound, and a catalyst composition for polymerization of a conjugated diene or copolymerization of a conjugated diene and an aromatic vinyl compound, which comprises the following components: (D) a neodymium complex, and (B) an ionic compound composed of a non-coordinate anion and a cation and/or an aluminoxane.

17 Claims, 3 Drawing Sheets

CATALYST COMPOSITION AND PROCESS FOR PRODUCING COPOLYMER

TECHNICAL FIELD

The present invention relates to a method for preparing a block copolymer of a conjugated diene and an aromatic vinyl compound and a specific block copolymer prepared by the method.

The present invention also relates to a catalyst composition for polymerization of a conjugated diene and a co-catalyst contained in the catalyst composition, as well as a method for preparing a polymer of a conjugated diene using the catalyst composition and a novel conjugated diene polymer obtainable by the preparation method.

The present invention further relates a catalyst composition for copolymerization of a conjugated diene and an aromatic vinyl compound and a co-catalyst contained in the catalyst composition, as well as a method for preparing a copolymer of a conjugated diene and an aromatic vinyl compound using the catalyst composition and a novel copolymer obtainable by the preparation method.

BACKGROUND ART

Various proposals have been made so far with regard to polymerization catalysts for conjugated dienes and aromatic vinyl compounds, and they play a highly important role in industrial fields. In particular, in order to obtain block copolymers of a conjugated diene and an aromatic vinyl compound with enhanced performance in thermal and mechanical properties, living anionic polymerization utilizing an alkyllithium as a polymerization initiator has been studied and developed.

In the living anionic polymerization, copolymers with different chemical structures having variety of characteristics can be prepared by suitably choosing various polymerization conditions such as addition amounts of the polymerization initiator, amounts and addition time of monomers. The living anionic polymerization is a reaction that is not accompanied by deactivation or novel production of reactive ends by the chain transfer reaction during polymerization, as compared to the radical polymerization, and the reaction is known to have a feature that molecular weight distribution of the resulting polymer is extremely narrower than that of a polymer obtained by the radical polymerization. However, in a polymerization system using an alkyllithium, it is difficult to control stereoregularity of conjugated diene moieties of a copolymer so as to give 1,4-cis-linkages.

Various copolymerization catalysts giving high stereoregularity with 1,4-cis-linkages for conjugated diene segments have been studied and developed so far. For example, complex catalyst systems are known which contain a compound of transition metal such as nickel, cobalt and titanium as a main component (see, Kogyo Kagaku Zasshi (Journal of Industrial Chemistry), 72, 2081, 1969; Plast. Kautsch., 40, 356, 1993; Makromol. Chem. Phys., 195, 2623, 199 etc.), and which contain a compound of rare earth metal such as neodymium and gadolinium as a main component (Macromol. Rapid Commun. 16, 563, 1992; J. Polym. Sci., ParA; Polym. Chem., 32, 1195, 1994; Polymer, 37, 349, 1996) and the like. Although these catalyst systems exhibit a relatively high cis-1,4-controllability, polymers with a high molecular weight and narrow molecular weight distribution, and copolymers with randomized monomer sequence cannot be obtained by means of these catalysts. Further, the polymerization of dienes does not proceed in the manner of living polymerization, and it is extremely difficult to introduce an aromatic vinyl compound to a polymerization terminus.

In order to attain a higher cis-1,4-linkage content and superior polymerization activity, complex catalyst systems which consist of a rare earth metal compound and an organometallic compound belonging to Group I to Group III have been studied and developed, and highly stereospecific polymerization has come to be actively studied (see, Makromol. Chem. Suppl, 4, 61, 1981; J. Polym. Sci., Polym. Chem. Ed., 18, 3345, 1980; German Patent Application No. 2,848,964; Sci. Sinica., 2/3, 734, 1980; Rubber Chem. Technol., 58, 117, 1985 and the like). Among these catalyst systems, complex catalysts containing a neodymium compound and an organoaluminum compound as main components were revealed to give a high cis-1,4-linkage content and have superior polymerization activity. The catalysts have already been used in industrial applications as polymerization catalysts for butadiene and the like (see, Macromolecules, 15, 230, 1982; Makromol. Chem., 94, 119, 1981).

With the recent progress of industrial technologies, requirements for polymeric materials as commercial products have become increasingly higher, and development of polymeric materials which have still higher thermal properties (thermal stability and the like) and mechanical properties (tensile modulus, bending modulus and the like) has come to be strongly desired. As one of promising means for achieving the object, attempts have been made to produce a polymer of a high cis-1,4-configuration content in microstructure and a narrow molecular weight distribution by using a catalyst having a high polymerization activity for conjugated dienes. However, no method has so far been found for producing polymers having such characteristics.

DISCLOSURE OF THE INVENTION

The first object of the present invention is to provide a method for preparing a block copolymer of a conjugated diene and an aromatic vinyl compound. More specifically, the object is to provide a method for preparing a block copolymer with high cis-1,4-configuration content in the microstructure, a high molecular weight, and a narrow molecular weight distribution. Another object of the present invention is to provide a copolymer having the aforementioned characteristics.

The second object of the present invention is to provide a catalyst for the polymerization of a conjugated diene. More specifically, the object is to provide a catalyst for polymerization for producing a polymer with a high cis-1,4-configuration content in the microstructure and a narrow molecular weight distribution. Another object of the present invention is to provide a polymer having the aforementioned characteristics, and a method for producing the same.

Further object of the present invention is to provide a catalyst for copolymerization of a conjugated diene and an aromatic vinyl compound. More specifically, the object is to provide a catalyst for polymerization for producing a copolymer with a high cis-1,4-configuration content in the microstructure, a high molecular weight, and a narrow molecular weight distribution, preferably a block copolymer having such characteristics. Another object of the present invention is to provide a copolymer having the aforementioned characteristics, and a method for producing the same.

The inventors of the present invention conducted various studies in order to achieve the aforementioned first object. As a result, the inventors of the present invention found that a conjugated diene and an aromatic vinyl compound can be efficiently copolymerized into a block copolymer by using a catalyst composition comprising a rare earth metal metallocene-type polymerization catalyst and a co-catalyst containing an ionic compound composed of a non-coordinate anion and a cation and/or an aluminoxane in combination. They also found that, by using the aforementioned catalyst composition for copolymerization, a conjugated diene and an aromatic vinyl compound can be copolymerized to prepare a copolymer with an extremely high cis-1,4-configuration content in the microstructure as well as a high molecular weight and a narrow molecular weight distribution.

The inventors of the present invention also conducted various studies in order to achieve the aforementioned second object. As a result, they found that conjugated dienes can be efficiently polymerized by using a catalyst composition comprising a rare earth metal metallocene type polymerization catalyst such as samarium complexes and a co-catalyst comprising an ionic compound composed of a non-coordinate anion and a cation and/or an aluminoxane in combination, and that a conjugated diene polymer with an extremely high cis-1,4-configuration content in the microstructure and a narrow molecular weight distribution can be produced by using the aforementioned catalyst composition for polymerization. Further, they found that this method can also be used for preparation of copolymers (PCT/JP00/1188). The inventors of the present invention further conducted studies and found that neodymium complexes among rare earth metal metallocene type polymerization catalysts gave particularly superior polymerization activity. The present invention was achieved on the basis of these findings.

The present invention thus provides a method for block copolymerization of a conjugated diene and an aromatic vinyl compound, which comprises the steps of carrying out homopolymerization of a conjugated diene in the presence of a catalyst composition comprising the following components:

(A) a metallocene type complex of a rare earth metal compound, and
(B) an ionic compound composed of a non-coordinate anion and a cation and/or an aluminoxane,
and then adding the aromatic vinyl compound.

According to preferred embodiments of the present invention, there are provided the aforementioned method, wherein the metallocene type complex is a samarium complex; the aforementioned method, wherein the ionic compound is triphenylcarbonium tetrakis(pentafluorophenyl) borate, triphenylcarbonium tetrakis(tetrafluorophenyl) borate, N,N-dimethylanilinium tetrakis(pentafluorophenyl)borate or 1,1'-dimethylferrocenium tetrakis(pentafluorophenyl)borate; and the aforementioned method, wherein the catalyst composition further contains an organometallic compound of an element belonging to from Group I to Group III in the periodic table.

According to another aspect of the present invention, there is provided a block copolymer, which is obtainable by block copolymerization of a conjugated diene and an aromatic vinyl compound in the presence of the aforementioned catalyst composition for polymerization. In addition, there is also provided a block copolymer, wherein a cis-1,4-configuration content in the microstructure is 80 mol % or more, preferably 90 mol % or more, and most preferably 95 mol % or more, a molecular weight Mn is 10,000 or more, preferably 20,000 or more, more preferably 50,000 or more, and most preferably 100,000 or more, and a molecular weight distribution Mw/Mn is 2.50 or less, preferably 2.00 or less, more preferably 1.80 or less, and most preferably 1.50 or less. This copolymer can be produced by block copolymerization of a conjugated diene and an aromatic vinyl compound according to the aforementioned method.

According to a further aspect of the present invention, there is provided a catalyst composition for polymerization of a conjugated diene or copolymerization of a conjugated diene and an aromatic vinyl compound, which contains the following components: (D) a neodymium complex, and (B) an ionic compound composed of a non-coordinate anion and a cation and/or an aluminoxane. According to preferred embodiments of the present invention, there are provided the aforementioned catalyst composition, wherein the ionic compound is triphenylcarbonium tetrakis(pentafluorophenyl)borate, triphenylcarbonium tetrakis(tetrafluorophenyl)borate, N,N-dimethylanilinium tetrakis(pentafluorophenyl)borate or 1,1'-dimethylferrocenium tetrakis(pentafluorophenyl)borate; and the aforementioned catalyst composition, which further contains an organometallic compound of an element belonging to from Group I to Group III in the periodic table.

According to a further aspect of the present invention, there is provided a co-catalyst for use in combination with a catalyst containing a neodymium complex for polymerization of a conjugated diene or a catalyst containing a neodymium complex for copolymerization of a conjugated diene and an aromatic vinyl compound, which comprises an ionic compound composed of a non-coordinate anion and a cation and/or an aluminoxane. According to further aspects of the present invention, there are provided a method for polymerization of a conjugated diene, wherein the polymerization is carried out in the presence of the aforementioned catalyst composition for polymerization; and a method for copolymerization of a conjugated diene and an aromatic vinyl compound, wherein the copolymerization is carried out in the presence of the aforementioned catalyst composition for polymerization.

BEST MODE FOR CARRYING OUT THE INVENTION

Figure 1:
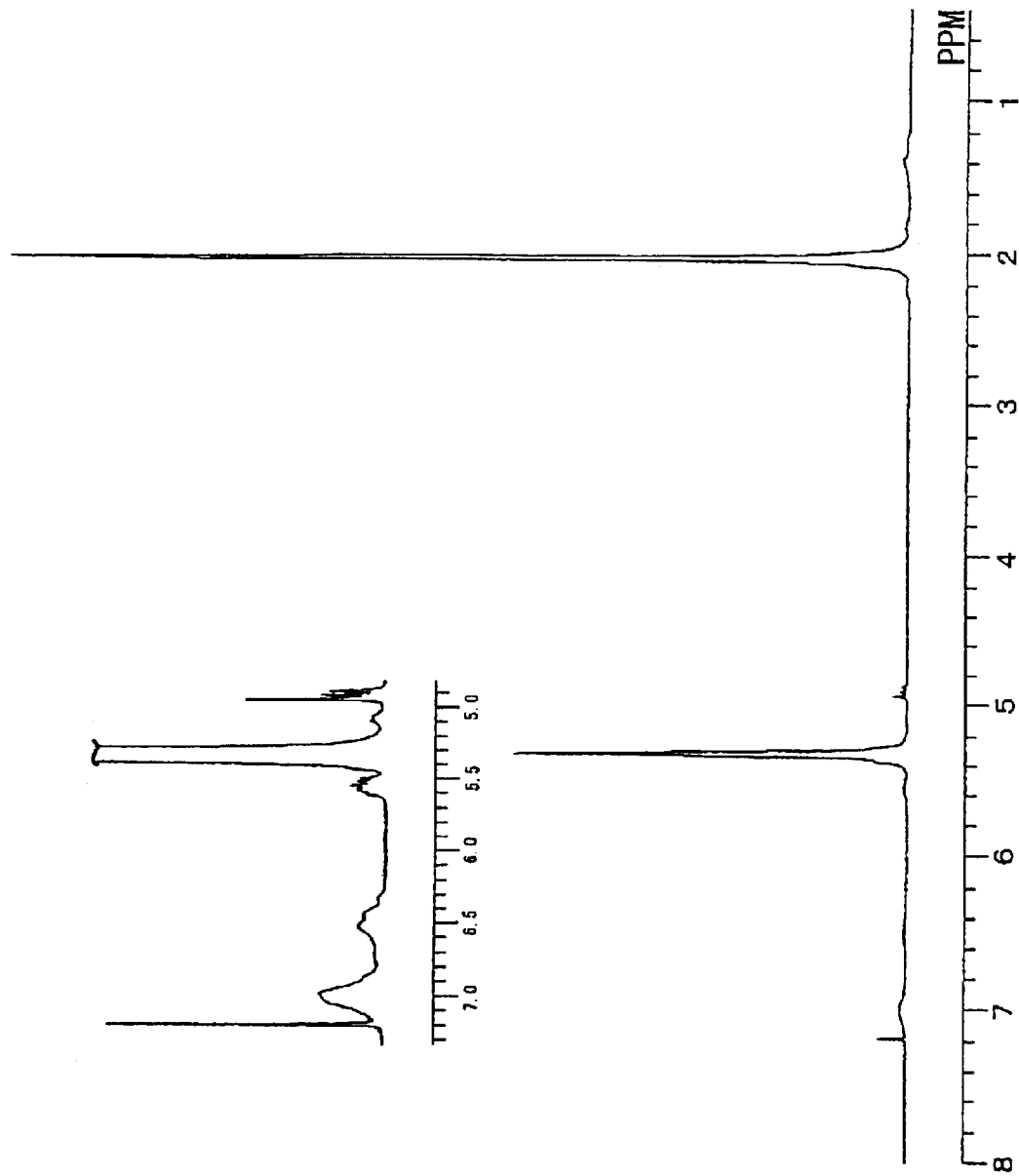
FIG. 1 depicts $^1$H NMR spectrum of the block copolymer obtained in Example 2.
Figure 2:
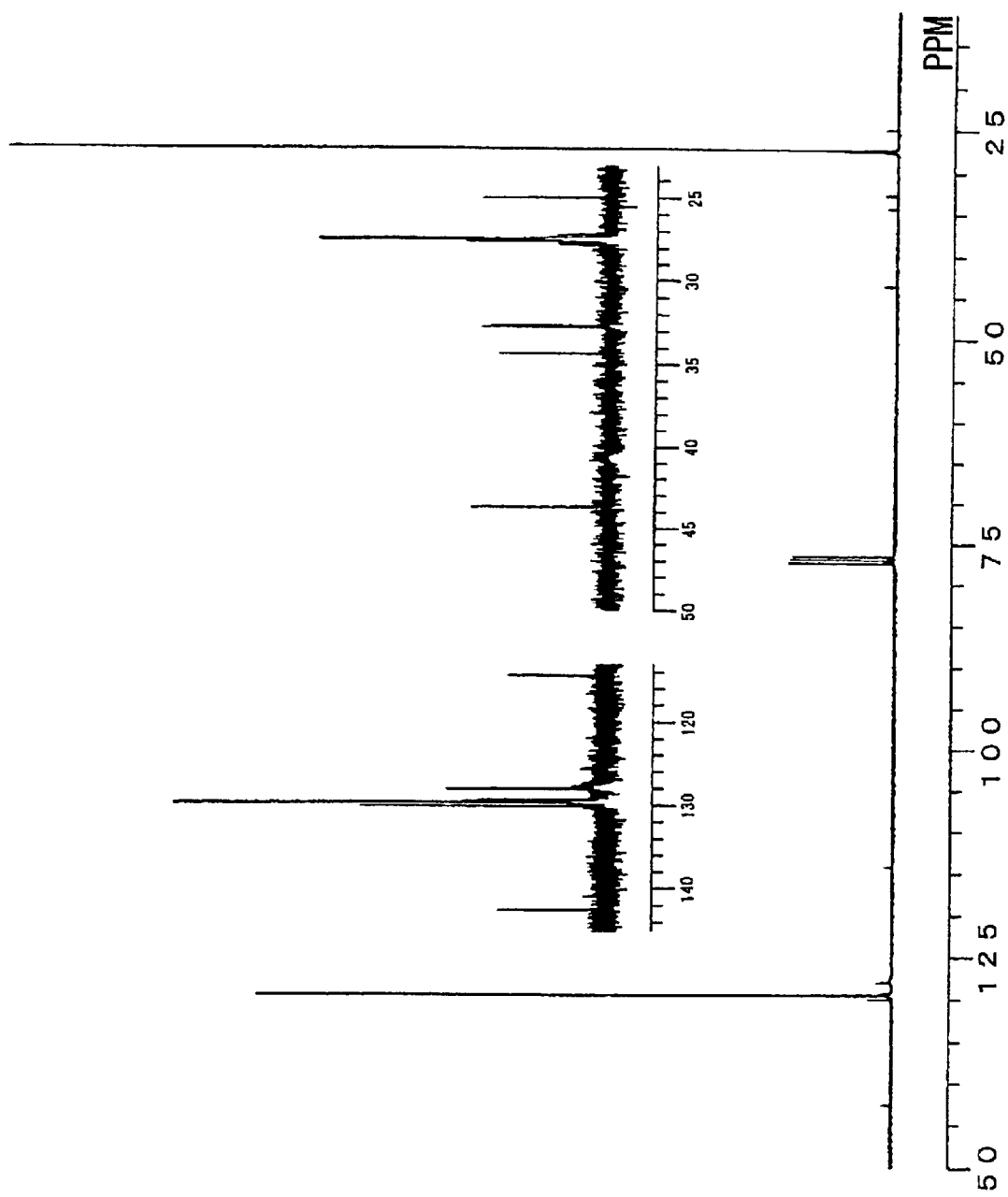
FIG. 2 depicts $^{13}$C NMR spectrum of the block copolymer obtained in Example 2.
Figure 3:
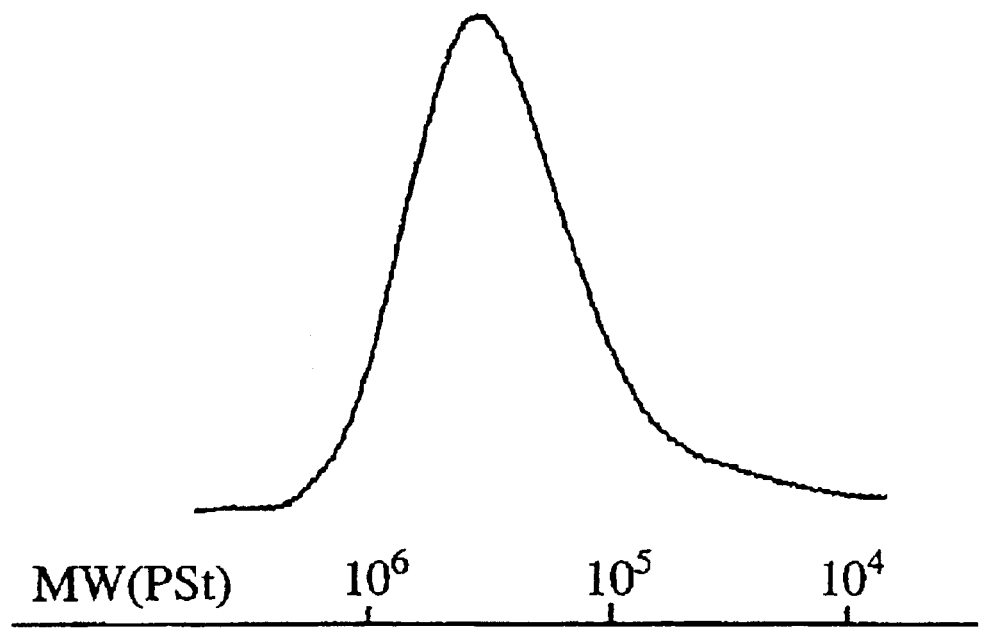
FIG. 3 depicts GPC chart of the block copolymer obtained in Example 2.

Examples of the metallocene type complex of a rare earth metal compound include divalent or trivalent rare earth metal compounds represented by the general formula (I): $R_aMX_b \cdot L_c$ or the general formula (II): $R_aMX_bQX_b$ wherein M represents a rare earth metal; R represents cyclopentadienyl group, a substituted cyclopentadienyl group, indenyl group, a substituted indenyl group, fluorenyl group, or a substituted fluorenyl group; X represents hydrogen atom, a halogen atom, an alkoxide group, a thiolate group, an amido group, or a hydrocarbon group having 1 to 20 carbon atoms; L represents a Lewis base compound; Q represents an element belonging to Group III in the periodic table; symbol "a" represents an integer of 1, 2 or 3; "b" represents an integer of 0, 1 or 2; and "c" represents an integer of 0, 1 or 2.

In the aforementioned general formula (I), an element selected from those of atomic numbers 57 to 71 in the periodic table can be used as the rare earth metal represented by M. Specific examples of the rare earth metal include lanthanium, cerium, praseodymium, neodymium, promethium, samarium, europium, gadolinium, terbium, dysprosium, holmium, erbium, thulium, ytterbium and lutetium. Among them, samarium is preferred. When the symbol "a" is 2, two of "R" may be the same or different from each other. Similarly, when the symbol "b" or "c" is 2, two of "X" or "L" may be the same or different from each other.

The types, numbers, and substituting positions of one or more substituents of the substituted cyclopentadienyl group, substituted indenyl group, and substituted fluorenyl group are not particularly limited. Examples of the substituent include, for example, methyl group, ethyl group, n-propyl group, isopropyl group, n-butyl group, isobutyl group, sec-butyl group, tert-butyl group, hexyl group, phenyl group and benzyl group, as well as hydrocarbon groups containing a silicon atom such as trimethylsilyl group. R may be bound to a part of X by means of a bridging group such as dimethylsilyl group, dimethylmethylene group, methylphenylmethylene group, diphenylmethylene group, ethylene group, and substituted ethylene group, and two of R may be bound to each other by means of a bridging group such as dimethylsilyl group, dimethylmethylene group, methylphenylmethylene group, diphenylmethylene group, ethylene group, and substituted ethylene group.

Specific examples of the substituted cyclopentadienyl group include, for example, methylcyclopentadienyl group, benzylcyclopentadienyl group, vinylcyclopentadienyl group, 2-methoxyethylcyclopentadienyl group, trimethylsilylcyclopentadienyl group, tert-butylcyclopentadienyl group, ethylcyclopentadienyl group, phenylcyclopentadienyl group, 1,2-dimethylcyclopentadienyl group, 1,3-dimethylcyclopentadienyl group, 1,3-di(tert-butyl) cyclopentadienyl group, 1,2,3-trimethylcyclopentadienyl group, 1,2,3,4-tetramethylcyclopentadienyl group, pentamethylcyclopentadienyl group, 1-ethyl-2,3,4,5-tetramethylcyclopentadienyl group, 1-benzyl-2,3,4,5-tetramethylcyclopentadienyl group, 1-phenyl-2,3,4,5-tetramethylcyclopentadienyl group, 1-trimethylsilyl-2,3,4,5-tetramethylcyclopentadienyl group, 1-trifluoromethyl-2,3,4,5-tetramethylcyclopentadienyl group and the like. Specific examples of the substituted indenyl group include, for example, 1,2,3-trimethylindenyl group, heptamethylindenyl group, 1,2,4,5,6,7-hexamethylindenyl group and the like. Pentamethylcyclopentadienyl group is preferred as R.

The alkoxide group represented by X may be any of aliphatic alkoxy groups such as methoxy group, ethoxy group, propoxy group, n-butoxy group, isobutoxy group, sec-butoxy group and tert-butoxy group, and aryl oxide groups such as phenoxy group, 2,6-di-tert-butylphenoxy group, 2,6-diisopropylphenoxy group, 2,6-dineopentylphenoxy group, 2-tert-butyl-6-isopropylphenoxy group, 2-tert-butyl-6-neopentylphenoxy group and 2-isopropyl-6-neopentylphenoxy group. Preferred is 2,6-di-tert-butylphenoxy group.

The thiolate group represented by X may be any of aliphatic thiolate groups such as thiomethoxy group, thioethoxy group, thiopropoxy group, thio-n-butoxy group, thioisobutoxy group, thio-sec-butoxy group, thio-tert-butoxy group, and aryl thiolate groups such as thiophenoxy group, 2,6-di-tert-butylthiophenoxy group, 2,6-diisopropylthiophenoxy group, 2,6-dineopentylthiophenoxy group, 2-tert-butyl-6-isopropylthiophenoxy group, 2-tert-butyl-6-thioneopentylphenoxy group, 2-isopropyl-6-thioneopentylphenoxy group and 2,4,6-triisopropylthiophenoxy group. Preferred is 2,4,6-triisopropylthiophenoxy group.

The amido group may be any of aliphatic amido groups such as dimethylamido group, diethylamido group and diisopropylamido group, and arylamido groups such as phenylamido group, 2,6-di-tert-butylphenylamido group, 2,6-diisopropylphenylamido group, 2,6-dineopentylphenylamido group, 2-tert-butyl-6-isopropylphenylamido group, 2-tert-butyl-6-neopentylphenylamido group, 2-isopropyl-6-neopentylphenylamido group and 2,4,6-tert-butylphenylamido group. Preferred is 2,4,6-tert-butylphenylamido group.

The halogen atom represented by X may be any of fluorine atom, chlorine atom, bromine atom, and iodine atom. Chlorine atom and iodine atom are preferred. Specific examples of the hydrocarbon group having 1 to 20 of carbon atoms include, for example, linear or branched aliphatic hydrocarbon groups such as methyl group, ethyl group, n-propyl group, isopropyl group, n-butyl group, isobutyl group, sec-butyl group, tert-butyl group, neopentyl group, hexyl group and octyl group, aromatic hydrocarbon groups such as phenyl group, tolyl group and naphthyl group, and aralkyl groups such as benzyl group, as well as hydrocarbon groups containing a silicon atom such as trimethylsilylmethyl group and bistrimethylsilylmethyl group. Among them, methyl group, ethyl group, isobutyl group, trimethylsilylmethyl group and the like are preferred. As X, hydrogen atom, a halogen atom, or a hydrocarbon group having 1 to 20 carbon atoms is preferred.

The Lewis base compound represented by L is not particularly limited so long as said compound can coordinate to a metal by means of an electron pair, and the compound may be an inorganic compound or an organic compound. Examples of the Lewis base compound include ether compounds, ester compounds, ketone compounds, amine compounds, phosphine compounds, silyloxy compounds and the like. However, the compounds are not limited to the above examples. In the general formula (II), Q represents an element belonging to Group III in the periodic table. Examples of such an element are-boron, aluminum, gallium and the like. Aluminum is preferred.

Specific examples of the metallocene type complex of a rare earth metal compound represented by the formula (I) include, for example, bispentamethylcyclopentadienylbistetrahydrofuran samarium, methylbispentamethylcyclopentadienyltetrahydrofuran samarium, chlorobispentamethylcyclopentadienyltetrahydrofuran samarium, iodobispentamethylcyclopentadienyltetrahydrofuran samarium and the like. Examples of the metallocene type complex of a rare earth metal compound represented by the formula (II) include, for example, dimethylaluminum($\mu$-dimethyl)-bis(pentamethylcyclopentadienyl) samarium and the like.

The ionic compound used as a co-catalyst is not particularly limited so long as the compound is composed of a non-coordinate anion and a cation. Examples include, for example, ionic compounds that can react with the aforementioned rare earth metal compounds to generate a cationic transition metal compound. Examples of the non-coordinate anion include, for example, tetra(phenyl)borate, tetrakis (monofluorophenyl)borate, tetrakis(difluorophenyl)borate, tetrakis(trifluorophenyl)borate, tetrakis(trifluorophenyl) borate, tetrakis(pentafluorophenyl)borate, tetrakis (tetrafluoromethylphenyl)borate, tetra(tolyl)borate, tetra (xylyl)borate, (triphenyl, pentafluorophenyl)borate, [tris (pentafluorophenyl), phenyl]borate, tridecahydride-7,8-dicarbaundecaborate and the like.

Examples of the cation include, for example, carbonium cations, oxonium cations, ammonium cations, phosphonium cations, cycloheptatrienyl cations, ferrocenium cations that contain a transition metal and the like. Specific examples of the carbonium cations include trisubstituted carbonium cations such as triphenylcarbonium cation and trisubstituted phenylcarbonium cations. Specific examples of the trisubstituted phenylcarbonium cations include tri(methylphenyl)carbonium cation, tri(dimethylphenyl)carbonium cation and the like. Specific examples of the ammonium cations include trialkylammonium cations such as trimethylammonium cation, triethylammonium cation, tripropylammonium cation, tributylammonium cation and tri(n-butyl)ammonium cation, N,N-dialkylanilinium cations such as N,N-diethylanilinium cation and N,N-2,4,6-pentamethylanilinium cation, dialkylammonium cations such as di(isopropyl)ammonium cation and dicyclohexylammonium cation and the like. Specific examples of the phosphonium cations include triarylphosphonium cations such as triphenylphosphonium cation, tri(methylphenyl)phosphonium cation and tri(dimethylphenyl)phosphonium cation.

Preferably used ionic compounds are those consisting of a combination of each component arbitrarily selected from the non-coordinate anion and the cation. Preferred examples of the ionic compound are, for example, triphenylcarbonium tetrakis(pentafluorophenyl)borate, triphenylcarbonium tetrakis(tetrafluorophenyl)borate, N,N-dimethylanilinium tetrakis(pentafluorophenyl)borate, 1,1'-dimethylferrocenium tetrakis(pentafluorophenyl)borate and the like. The ionic compounds may be used alone, or two or more of them may be used in combination. As a Lewis acid that can react with a transition metal compound to generate a cationic transition metal compound, $B(C_6F_5)_3$, $Al(C_6F_5)_3$ and the like may be used, and these acids may be used in combination with the aforementioned ionic compounds.

As the aluminoxane used as the co-catalyst, for example, those obtained by contacting an organoaluminum compound with a condensing agent can be used. More specifically, linear aluminoxanes and cyclic aluminoxanes represented by the general formula $(-Al(R')O-)_n$ can be used. In the formula, R' is a hydrocarbon group having 1 to 10 carbon atoms, and this hydrocarbon group may be substituted with a halogen atom and/or an alkoxy group. The symbol "n" represents degree of polymerization, and "n" is preferably 5 or more, more preferably 10 or more. Examples of R' include methyl group, ethyl group, propyl group, isobutyl group and the like, and methyl group is preferred. Examples of the organoaluminum compound used as a raw material of the aluminoxane include, for example, trialkylaluminum such as trimethylaluminum, triethylaluminum and triisobutylaluminum, mixtures thereof and the like, and trimethylaluminum is especially preferred. Aluminoxanes produced by using a mixture of trimethylaluminum and tributylaluminium as a raw material can also be suitably used. The aluminoxanes may be used in combination with the ionic compounds.

The catalyst composition used for the method of the present invention contains the aforementioned components (A) and (B), and may further contain an organometallic compound of an element belonging to from Groups I to III in the periodic table as a component (C). Examples of the organometallic compound include organic aluminum compounds, organic lithium compounds, organic magnesium compounds, organic zinc compounds, organic boron compounds and the like. More specifically, methyllithium, butyllithium, phenyllithium, benzyllithium, neopentyllithium, trimethylsilylmethyllithium, bistrimethylsilylmethyllithium, dibutylmagnesium, dihexylmagnesium, diethylzinc, dimethylzinc, trimethylaluminum, triethylaluminum, triisobutylaluminium, trihexylaluminium, trioctylaluminium, tridecylaluminium and the like may be used. Furthermore, organic metal halide compounds such as ethylmagnesium chloride, butylmagnesium chloride, dimethylaluminum chloride, diethylaluminum chloride, sesquiethylaluminum chloride and ethylaluminium dichloride, and hydrogenated organometallic compounds such as diethylaluminum hydride and sesquiethylaluminum hydride may be used. These organometallic compounds may be used alone, or two or more of them may be used in combination.

The mixing ratio of the aforementioned components (A) and (B) in the aforementioned composition may be suitably selected depending on the type of a monomer used for polymerization, the type and conditions of a reaction and the like. In a composition containing a rare earth metal compound and an aluminoxane, the ratio of the component (A) and the component (B) (molar ratio) is generally about 1:1 to 1:10000, preferably 1:10 to 1:1000, and more preferably 1:50 to 1:500. In a composition containing a rare earth metal compound and an ionic compound, the ratio of the component (A) and the component (B) (molar ratio) may be about 1:0.1 to 1:10, preferably 1:0.2 to 1:5, and more preferably 1:0.5 to 1:2. In a composition containing the component (C), the mixing ratio of the rare earth metal compound and the component (C) (molar ratio) may be, for example, about 1:0.1 to 1:1000, preferably 1:0.2 to 1:500, and more preferably 1:0.5 to 1:50.

The type of the conjugated diene compound as a monomer that can be polymerized by the polymerization method of the present invention is not particularly limited. Examples of the monomer include, for example, 1,3-butadiene, isoprene, 1,3-pentadiene, 2-ethyl-1,3-butadiene, 2,3-dimethylbutadiene, 2-methylpentadiene, 4-methylpentadiene, 2,4-hexadiene or the like. Among them, 1,3-butadiene is preferred. These monomer components may be used alone, or two or more of them may be used in combination.

The type of the aromatic vinyl compound monomer that can be copolymerized by the polymerization method of present invention is not also particularly limited, and it may be, for example, styrene, p-methylstyrene, m-methylstyrene, p-tert-butylstyrene, α-methylstyrene, chloromethylstyrene, p-tert-butoxystyrene, dimethylaminomethylstyrene, dimethylaminoethylstyrene, vinyltoluene or the like. Among them, styrene is preferred. These monomer components may be used alone, or two or more of them may be used in combination.

The polymerization method of the present invention may be performed either in the presence or absence of a solvent. Where a solvent is used, the kind of the solvent is not particularly limited so long as the solvent is substantially inactive in the polymerization reaction and has sufficient solubility for the monomer and the catalyst composition. Examples of the solvent include, for example, saturated aliphatic hydrocarbons such as butane, pentane, hexane and heptane; saturated cycloaliphatic hydrocarbons such as cyclopentane and cyclohexane; monoolefins such as 1-butene and 2-butene; aromatic hydrocarbons such as benzene and toluene; halogenated hydrocarbons such as methylene chloride, chloroform, carbon tetrachloride, trichloroethylene, perchloroethylene, 1,2-dichloroethane, chlorobenzene, bromobenzene and chlorotoluene. Among them, toluene is preferred. Two or more solvents may be used in combination.

Polymerization temperature in the polymerization method of the present invention may be, for example, in the range of from −100° C. to 100° C., preferably in the range of from −50° C. to 80° C. Polymerization time may be, for example, about 1 minute to 50 hours, preferably about 5 minutes to 5 hours. However, these reaction conditions may be suitably selected depending on the type of monomers and the type of the catalyst composition, and they are not limited to the ranges exemplified above. After homopolymerization of conjugated diene is carried out and the polymerization degree reaches a given level, an aromatic vinyl compound can be added and polymerization reaction can be further carried out until the polymerization degree reaches a given level. After the polymerization degree reaches the given level, the reaction may be stopped by adding a known polymerization terminator to the polymerization system, and then a produced copolymer can be separated from the reaction system in a conventional manner.

The content of the cis-configuration in the microstructure of the block copolymer of the present invention may generally be 80 mol % or more, preferably 90 mol % or more, and most preferably 95 mol % or more. The molecular weight Mn may be 10,000 or more, preferably 20,000 or more, more preferably 50,000 or more, and most preferably 100,000 or more, and the molecular weight distribution Mw/Mn may be 2.50 or less, preferably 2.00 or less, more preferably 1.80 or less, and most preferably 1.50 or less. The copolymer of the present invention is a block copolymer that has a sequence substantially consisting of blocks of the same monomers. The copolymers of present invention are expected to have superior thermal characteristics (thermal stability and the like) and mechanical properties (tensile modulus, bending modulus, impact resistance and the like), and therefore, they can be utilized for various applications as polymeric materials.

Examples of the neodymium complex contained in the catalyst composition provided as the second aspect of the present invention include trivalent neodymium complexes represented by the general formula (II): $R_aMX_b \cdot L_c$ or the general formula (IV): $R_aMX_bQX_b$ wherein M represents neodymium; R represents pentadienyl group, a substituted pentadienyl group, cyclopentadienyl group, a substituted cyclopentadienyl group, indenyl group, a substituted indenyl group, fluorenyl group, or a substituted fluorenyl group; X represents hydrogen atom, a halogen atom, an alkoxide group, a thiolate group, an amido group, or a hydrocarbon group having 1 to 20 carbon atoms; L represents a Lewis base compound; Q represents an element belonging to Group III in the periodic table; "a" represents an integer of 1, 2, or 3; "b" represents an integer of 0, 1 or 2; and "c" represents an integer of 0, 1 or 2. When the symbol "a" is 2, two of "R" may be the same or different from each other. Similarly, when the symbol "b" or "c" is 2, two of a "X" or "L" may be the same or different from each other.

As the substituted pentadienyl group, substituted cyclopentadienyl group, substituted indenyl group and substituted fluorenyl group represented by R; the alkoxide group, thiolate group, amido group, halogen atom and hydrocarbon group having 1 to 20 carbon atoms represented by X, the Lewis base compound represented by L, and element belonging to Group III in the periodic table represented by Q, those explained above can be used.

Specific examples of the neodymium complex represented by the general formula (III) include, for example, tris(2,4-dimethylpentadienyl) neodymium, chlorobis(2,4-dimethylpentadienyl) neodymium, dichloro(2,4-dimethylpentadienyl) neodymium, methylbispentamethylcylcopentadienyltetrahydrofuran neodymium, chlorobispentamethylcylcopentadienyltetrahydrofuran neodymium, iodobispentamethylcyclopentadienyltetrahydrofuran neodymium and the like. Specific examples of the neodymium complex represented by the general formula (IV) include, for example, dimethylaluminium(μ-dimethyl)bis-(pentamethylcyclopentadienyl) neodymium and the like.

As the ionic compound and/or aluminoxane used as the co-catalyst, those explained above can be used. The catalyst composition of the present invention containing a neodymium complex may contain (C) an organometallic compound of an element belonging to any of Groups I to III in the periodic table, besides the aforementioned components (D) and (B). As the organometallic compound, those exemplified above can be used.

The mixing ratio of the aforementioned components (D) and (B) in the catalyst composition of the present invention containing a neodymium complex may be suitably selected depending on the type of a monomer used for polymerization, the type and conditions of a reaction and the like. In a composition containing a neodymium complex and an aluminoxane, the ratio of the component (D) and the component (B) (molar ratio) is generally about 1:1 to 1:10000, preferably 1:10 to 1:1000, and more preferably 1:50 to 1:500. In a composition containing a neodymium complex and an ionic compound, the ratio of the component (D) and the component (B) (molar ratio) may be about 1:0.1 to 1:10, preferably 1:0.2 to 1:5, and more preferably 1:0.5 to 1:2. In a catalyst composition containing the component (C), the mixing ratio of the neodymium complex (D) and the component (C) (molar ratio) may be, for example, about 1:0.1 to 1:1000, preferably 1:0.2 to 1:500, and more preferably 1:0.5 to 1:50.

As conjugated-diene compound monomers that can be polymerized, conjugated-diene compound monomers that can be copolymerized, and aromatic vinyl compound monomers that can be copolymerized in the polymerization method using the aforementioned catalyst composition of the present invention, those monomers exemplified above can be used. The polymerization method and polymerization conditions such as temperature are also similar to those explained above.

The content of the cis-configuration in the microstructure of a polymer that can be obtained by the method for polymerizing a conjugated diene using the catalyst composition of the present invention may generally be 80 mol % or more, preferably 90 mol % or more, more preferably 95 mol % or more, and most preferably 98 mol % or more. As for the molecular weight distribution, Mw/Mn may be 2.00 or less, preferably 1.80 or less, more preferably 1.60 or less, further preferably 1.40 or less, and most preferably 1.30 or less.

The content of the cis-configuration in the microstructure of the copolymer that can be obtained by the copolymerization method using the catalyst composition of the present invention may generally be 80 mol % or more, preferably 90 mol % or more, and particularly preferably 95 mol % or more. The molecular weight Mn may be 10,000 or more, preferably 20,000 or more, more preferably 50,000 or more, and most preferably 100,000 or more, and the molecular weight distribution Mw/Mn may be 2.50 or less, preferably 2.00 or less, more preferably 1.80 or less, and most preferably 1.50 or less. The copolymer of the present invention is a random copolymer that shows a substantially randomized monomer sequence. The copolymers of the present invention are expected to have superior thermal characteristics (thermal stability and the like) and mechanical properties (tensile modulus, bending modulus and the like), and therefore, they can be utilized for various applications as polymeric materials.

EXAMPLES

The present invention will be explained more specifically with reference to the following examples. However, the scope of the present invention is not limited to these examples. Microstructures of polybutadiene referred to in the examples were calculated from integration ratios of peaks observed by $^1$H NMR and $^{13}$C NMR [$^1$H NMR: δ 4.8–5.0 (=CH$_2$ of 1,2-vinyl unit), 5.2–5.8 (—CH= of 1,4-unit and —CH= of 1,2-vinyl unit), $^{13}$C NMR: δ27.4 (1,4-cis unit), 32.7 (1,4-trans unit), 127.7–131.8 (1,4-unit), 113.8–114.8 and 143.3–144.7 (1,2-vinyl unit)]. Styrene contents referred to in the examples were calculated from integration ratios of the peaks obtained by $^1$H NMR [δ 4.8–5.0 (=CH$_2$ of 1,2-vinyl unit in butadiene), δ 5.2–5.8 (—CH= of 1,4-vinyl unit and 1,2-vinyl unit in butadiene) and δ 6.3–7.3 (aromatic ring of styrene unit)]. The weight average molecular weights (Mw), number average molecular weights (Mn) and molecular weight distributions (Mw/Mn) were obtained by gel permeation chromatography (GPC) using polystyrene as a standard substance.

Example 1

In a glove box under nitrogen atmosphere, 0.05 mmol of dimethylaluminum($\mu$-dimethyl)bis(pentamethylcyclopentadienyl) samarium [(Cp*)$_2$Sm($\mu$-Me)$_2$AlMe$_2$](Cp*:pentamethylcyclopentadienyl ligand) was put into a sufficiently dried 30-ml pressure glass bottle and dissolved in 9 ml of toluene. Then, 0.15 mmol of triisobutylaluminum and 0.05 mmol of triphenylcarbonium tetrakis(pentafluorophenyl)borate (Ph$_3$CB(C$_6$F$_5$)$_4$) were added into the bottle, and the bottle was sealed with a stopper. The bottle was then taken out from the glove box and 0.27 g of 1,3-butadiene was put into the bottle, and polymerization was carried out at –20° C. for 10 minutes. The polymerization product was sampled at this stage, and it was found that the product had a butadiene addition ratio of 98%, weight average molecular weight of 55,400, number average molecular weight of 45,000 and Mw/Mn of 1.23. Then, 0.6 ml of styrene was added to the bottle, and polymerization was further carried out at –20° C. for 5 hours. After the polymerization, 10 ml of methanol containing 10 wt % BHT [2,6-bis(tert-butyl)-4-methylphenol] was added to the reaction system to stop the reaction. The polymer was separated by using a large amount of a mixed solvent of methanol/hydrochloric acid and dried at 60° C. in vacuo. The amount of the resulting polymer was 0.33 g. The styrene content in the polymer was 10.0 wt % (5.5 mol %), and the cis-content in the microstructure of the butadiene units was 99.0 mol %. The weight average molecular weight was 60,700, number average molecular weight was 46,000, and Mw/Mn was 1.32.

Example 2

In a glove box under nitrogen atmosphere, 0.01 mmol of dimethylaluminum($\mu$-dimethyl)bis(pentamethylcyclopentadienyl) samarium [(Cp*)$_2$Sm($\mu$-Me)$_2$AlMe$_2$] was put into a sufficiently dried 100-ml pressure glass bottle and dissolved in 30 ml of toluene. Then, 0.03 mmol of triisobutylaluminum and 0.01 mmol of triphenylcarbonium tetrakis(pentafluorophenyl)borate (Ph$_3$CB(C$_6$F$_5$)$_4$) were added into the bottle, and the bottle was sealed with a stopper. The bottle was then taken out from the glove box, and 1.70 g of 1,3-butadiene was put into the bottle. Polymerization was carried out at 50° C. for 10 minutes. Then, 5.0 ml of styrene was added to the bottle, and polymerization was further carried out at 50° C. for 5 hours. After the polymerization, 10 ml of methanol containing 10 wt % BHT [2,6-bis(tert-butyl)-4-methylphenol] was added to the reaction system to stop the reaction. The polymer was separated by using a large amount of 2-propanol and dried at 60° C. in vacuo. The amount of the resulting polymer was 1.75 g. The styrene content in the polymer was 10.4 wt % (5.7 mol %), and the cis-content in the microstructure of the butadiene units was 96.2 mol %. The weight average molecular weight was 801,000, number average molecular weight was 459,400, and Mw/Mn was 1.74.

Example 3

In a glove box under nitrogen atmosphere, 0.01 mmol of dimethylaluminum($\mu$-dimethyl)bis(pentamethylcyclopentadienyl) neodymium [(Cp*)$_2$Nd($\mu$-Me)$_2$AlMe$_2$] was put into a sufficiently dried 30-ml pressure glass bottle and dissolved in 6 ml of toluene. Then, MMAO (toluene-soluble aluminoxane sold by TOSOH and Akzo Co.) was added into the bottle so that the elemental ratio Al/Nd became 200, and the bottle was sealed with a stopper. The bottle was then taken out from the glove box, and 1.5 g of 1,3-butadiene was put into the bottle. Then, polymerization was carried out at 50° C. for 5 minutes. After the polymerization, 10 ml of methanol containing 10 wt % BHT [2,6-bis(tert-butyl)-4-methylphenol] was added to the reaction system to stop the reaction. The polymer was separated by using a large amount of a mixed solvent of methanol/hydrochloric acid and dried at 60° C. in vacuo. The yield of the resulting polymer was 66 wt %. The cis-content in the microstructure of the polymer was 97.5 mol %. The number average molecular weight was 362,400, and Mw/Mn was 1.89.

Example 4

In a glove box under nitrogen atmosphere, 0.01 mmol of dimethylaluminum-($\mu$-dimethyl)bis(pentamethylcyclopentadienyl) neodymium [(Cp*)$_2$Nd($\mu$-Me)$_2$AlMe$_2$] was put into a sufficiently dried 30-ml pressure glass bottle and dissolved in 6 ml of toluene. Then, 0.03 mmol of triisobutylaluminum and 0.01 mmol of triphenylcarbonium tetrakis(pentafluorophenyl)borate (Ph$_3$CB(C$_6$F$_5$)$_4$) were added into the bottle, and the bottle was sealed with a stopper. The bottle was then taken out from the glove box, and 1.35 g of 1,3-butadiene was put into the bottle. Polymerization was carried out at 50° C. for 5 minutes. After the polymerization, 10 ml of methanol containing 10 wt % BHT was added to the reaction system to stop the reaction. The polymer was separated by using a large amount of a mixed solvent of methanol/hydrochloric acid and dried at 60° C. in vacuo. The yield of the resulting polymer was 76 wt %. The cis-content in the microstructure of the polymer was 96.1 mol %. The number average molecular weight was 400,600 and Mw/Mn was 1.66.

Example 5

In a glove box under nitrogen atmosphere, 0.01 mmol of dimethylaluminum-($\mu$-dimethyl)bis(pentamethylcyclopentadienyl) neodymium [(Cp*)$_2$Nd($\mu$-Me)$_2$AlMe$_2$] was put into a sufficiently dried 30-ml pressure glass bottle and dissolved in 6 ml of toluene. Then, 0.03 mmol of triethylaluminum and 0.01 mmol of triphenylcarbonium tetrakis(pentafluorophenyl)borate (Ph$_3$CB(C$_6$F$_5$)$_4$)

were added into the bottle, and the bottle was sealed with a stopper. The bottle was then taken out from the glove box, and 1.35 g of 1,3-butadiene was put into the bottle. Polymerization was carried out at 50° C. for 5 minutes. After the polymerization, 10 ml of methanol containing 10 wt % BHT was added to the reaction system to stop the reaction. The polymer was separated by using a large amount of a mixed solvent of methanol/hydrochloric acid and dried at 60° C. in vacuo. The yield of the resulting polymer was 84 wt %. The cis-content in the microstructure of the polymer was 77.0 mol %. The number average molecular weight was 239,500, and Mw/Mn was 1.42.

Example 6

In a glove box under nitrogen atmosphere, 0.01 mmol of dimethylaluminum-($\mu$-dimethyl)bis(pentamethylcyclopentadienyl) neodymium [(Cp*)$_2$Nd($\mu$-Me)$_2$AlMe$_2$] was put into a sufficiently dried 30-ml pressure glass bottle and dissolved in 6 ml of toluene. Then, 0.03 mmol of trimethylaluminum and 0.01 mmol of triphenylcarbonium tetrakis(pentafluorophenyl)borate (Ph$_3$CB(C$_6$F$_5$)$_4$) were added into the bottle, and the bottle was sealed with a stopper. The bottle was then taken out from the glove box, and 1.35 g of 1,3-butadiene was put into the bottle. Then, polymerization was carried out at 50° C. for 5 minutes. After the polymerization, 10 ml of methanol containing 10 wt % BHT was added to the reaction system to stop the reaction. The polymer was separated by using a large amount of a mixed solvent of methanol/hydrochloric acid and dried at 60° C. in vacuo. The yield of the resulting polymer was 93 wt %. The cis-content in the microstructure of the polymer was 64.8 mol %. The number average molecular weight was 353,400, and Mw/Mn was 1.56.

Example 7

In a glove box under nitrogen atmosphere, 0.01 mmol of tris(2,4-dimethyl-pentadienyl) neodymium [(2,4-DMBD)$_3$Nd] was put into a sufficiently dried 30-ml pressure glass bottle and dissolved in 6 ml of toluene. Then, MMAO (toluene-soluble aluminoxane sold by TOSOH and Akzo Co.) was added into the bottle so that the elemental ratio Al/Nd became 200, and the bottle was sealed with a stopper. The bottle was then taken out from the glove box, and 1.35 g of 1,3-butadiene was put into the bottle. Then, polymerization was carried out at 50° C. for 5 minutes. After the polymerization, 10 ml of methanol containing 10 wt % BHT [2,6-bis(tert-butyl)-4-methylphenol] was added to the reaction system to stop the reaction. The polymer was separated by using a large amount of a mixed solvent of methanol/hydrochloric acid and dried at 60° C. in vacuo. The yield of the resulting polymer was 86 wt %. The cis-content in the microstructure of the polymer was 81.8 mol %. The number average molecular weight was 39,700, and Mw/Mn was 2.21.

Example 8

In a glove box under nitrogen atmosphere, 0.03 mmol of dimethylaluminum-($\mu$-dimethyl)bis(pentamethylcyclopentadienyl) neodymium [(Cp*)$_2$Nd($\mu$-Me)$_2$AlMe$_2$] was put into a sufficiently dried 30-ml pressure glass bottle and dissolved in 1 ml of toluene. Then, 0.09 mmol of triisobutylaluminum and 0.03 mmol of triphenylcarbonium tetrakis(pentafluorophenyl)borate (Ph$_3$CB(C$_6$F$_5$)$_4$) were added into the bottle, and the bottle was sealed with a stopper. The bottle was then taken out from the glove box, and 0.81 g of 1,3-butadiene and 1.7 ml of styrene were put into the bottle. Then, polymerization was carried out at 50° C. for 1 hour. After the polymerization, 10 ml of methanol containing 10 wt % BHT was added to the reaction system to stop the reaction. The polymer was separated by using a large amount of a mixed solvent of methanol/hydrochloric acid and dried at 60° C. in vacuo. The yield of the resulting polymer was 25 wt %. The styrene content of the polymer was 8.1 mol %, and the cis-content in the microstructure of the butadiene units was 87.8 mol %. The number average molecular weight was 46,100, and Mw/Mn was 1.61.

INDUSTRIAL APPLICABILITY

According to the method of the present invention, a block copolymer can be obtained from a conjugated diene and an aromatic vinyl compound, which has an extremely high content of cis-1,4-configuration in the microstructure, a high molecular weight and a narrow molecular weight distribution. Further, when a conjugated diene and an aromatic vinyl compound are copolymerized by using the catalyst composition of present invention containing a neodymium complex, a polymer can be obtained which has an extremely high content of cis-1,4-configuration in the microstructure and a narrow molecular weight distribution.

What is claimed is:

1. A method for block copolymerization of a conjugated diene and an aromatic vinyl compound, comprising homopolymerizing the conjugated diene in the presence of a catalyst composition comprising the following components:
   (A) a metallocene complex of a rare earth metal compound, and
   (B) an ionic compound composed of a non-coordinate anion and a cation and/or an aluminoxane, before the aromatic vinyl compound is added.

2. The method according to claim 1, wherein the metallocene complex is a samarium complex.

3. The method according to claim 1, wherein the ionic compound is triphenylcarbonium tetrakis(pentafluorophenyl)borate, triphenylcarbonium tetrakis(tetrafluorophenyl)borate, N,N-dimethylanilinium tetrakis(pentafluorophenyl)borate or 1,1'-dimethylferrocenium tetrakis(pentafluorophenyl)borate.

4. The method according to claim 1, wherein the catalyst composition further comprises an organometallic compound of an element belonging to Group I to Group III in the periodic table.

5. A block copolymer, which is obtained by the method according to claim 1.

6. The block copolymer according to claim 5, wherein a cis-1,4-configuration content in the microstructure is 80 mol % or more, and a molecular weight distribution Mw/Mn is 2.50 or less.

7. A block copolymer of a conjugated diene and an aromatic vinyl compound, wherein a cis-1,4-configuration content in the microstructure is 80 mol % or more, a molecular weight is 10,000 or more, and a molecular weight distribution Mw/Mn is 2.50 or less.

8. A block copolymer according to claim 7 wherein the cis-1,4-configuration content in the microstructure is 90 mol % or more.

9. A block copolymer according to claim 7 wherein the cis-1,4-configuration content in the microstructure is 95 mol % or more.

10. A block copolymer according to claim 7 wherein the Mw/Mn is 2.00 or less.

11. A block copolymer according to claim 7 wherein the Mw/Mn is 1.80 or less.

12. A block copolymer according to claim 7 wherein the Mw/Mn is 1.50 or less.

13. A method according to claim 1, wherein the aluminoxane is a linear or cyclic aluminoxane of the formula:

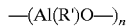

where R' is a hydrocarbon group of 1–10 C atoms and n is 5 or more.

14. A method according to claim 1, wherein the conjugated diene is 1,3-butadiene, isoprene, 1,3-pentadiene, 2-ethyl-1,3-butadiene, 2,3-dimethylbutadiene, 2-methylpentadiene, 4-methylpentadiene, or 2,4-hexadiene.

15. A method according to claim 1, wherein the aromatic vinyl compound is styrene, p-methylstyrene, m-methylstyrene, p-tert-butylstyrene, α-methylstyrene, chloromethyistyrene, p-tert-butoxystyrene, dimethylaminomethylstyrene, dimethylaminoethylstyrene, or vinyltoluene.

16. The method according to claim 4, wherein the organometallic compound is an organic aluminum compound, an organic lithium compound, an organic magnesium compound, an organic zinc compound, or an organic boron compound.

17. The method according to claim 4, wherein the organometallic compound is methyllithium, butyllithium, phenyllithium, benzyllithium, neopentyllithium, trimethylsilylmethyllithium, bistrimetbylsilylmethyllithium, dibutylmagnesium, dihexylmagnesium, diethylzinc, dimethylzinc, trimethylaluminum, triethylaluminum, triisobutylaluxninum, trihexylaluminum, trioctylaluminum, tridecylaluminum, ethylmagnesium chloride, butylmagnesium chloride, dimethylaluminum chloride, diethylaluminum chloride, sesquiethylaluininum chloride, ethylaluminum dichioride, diethylaluininum hydride, sesquiethylaluminuin hydride, or a combination thereof.

* * * * *

UNITED STATES PATENT AND TRADEMARK OFFICE
CERTIFICATE OF CORRECTION

PATENT NO. : 6,960,631 B2
APPLICATION NO. : 10/240925
DATED : November 1, 2005
INVENTOR(S) : Shojiro Kaita It is certified that error appears in the above-identified patent and that said Letters Patent is hereby corrected as shown below:

Column 15, line 17 reads "chloromethyistyrene" should read --chloromethylstyrene --
Column 16, line 9 reads "bistrimetbylsilylmethyllithium' should read
-- bistrimethylsilylmethyllithium --
Column 16, line 12 reads "triisobutylaluxninum" should read -- triisobutylaluminum --
Column 16, line 15 reads "sesquiethylaluininum" should read -- sesquiethylaluminum --
Column 16, line 16 reads "dichioride, diethyaluininum" should read -- dichloride, diethylaluminum --
Column 16, line 17 reads "sesquiethylaluminuin" should read -- sesquiethylaluminum --

Signed and Sealed this

Twelfth Day of December, 2006

JON W. DUDAS
*Director of the United States Patent and Trademark Office*